United States Patent
Lin (10) Patent No.: US 9,131,764 B2
(45) Date of Patent: Sep. 15, 2015

(54) EYEGLASS FILLET FASTENER

(71) Applicant: High Rainbow Ent, Co., Ltd, Tainan (TW)

(72) Inventor: Hsin-Feng Lin, Tainan (TW)

(73) Assignee: HIGH RAINBOW ENT, CO., LTD, Tainan (TW)

( * ) Notice: Subject to any disclaimer, the term of this patent is extended or adjusted under 35 U.S.C. 154(b) by 0 days.

(21) Appl. No.: 14/250,707

(22) Filed: Apr. 11, 2014

(65) Prior Publication Data
US 2014/0325795 A1    Nov. 6, 2014

(30) Foreign Application Priority Data

May 2, 2013 (TW) .............................. 102115682 A (51) Int. Cl.
*A45F 5/00* (2006.01)
*G02C 3/00* (2006.01)
*G02C 5/22* (2006.01)

(52) U.S. Cl.
CPC . *A45F 5/00* (2013.01); *G02C 3/003* (2013.01); *A45F 2005/006* (2013.01); *A45F 2200/0541* (2013.01); *G02C 5/2263* (2013.01); *Y10T 24/1397* (2015.01)

(58) Field of Classification Search
CPC .... G02C 5/2263; G02C 5/10; G02C 2200/08; G02C 2200/18; G02C 5/146; G02C 5/2209; G02C 1/04; G02C 2200/04; G02C 2200/06; G02C 2200/10; G02C 3/003; G02C 5/143; G02C 5/20; A45F 2005/006; A45F 2200/0541; A45F 5/00; Y10T 24/1397

USPC ............... 24/3.13, 265 CB, 265 EC, 265 AL; 351/110, 111, 116, 119, 120, 123

See application file for complete search history.

(56) References Cited

U.S. PATENT DOCUMENTS

| | | | | |
|---|---|---|---|---|
| 4,976,531 A | * | 12/1990 | Kahaney | 351/156 |
| 5,565,937 A | * | 10/1996 | Lee | 351/120 |
| 5,638,147 A | * | 6/1997 | Wang-Lee | 351/120 |
| 5,652,637 A | * | 7/1997 | Marini | 351/116 |
| 5,781,273 A | * | 7/1998 | Boden | 351/156 |
| 5,946,072 A | * | 8/1999 | Canavan | 351/120 |
| 6,290,356 B1 | * | 9/2001 | Chi | 351/120 |

(Continued)

FOREIGN PATENT DOCUMENTS

| | | |
|---|---|---|
| EP | 1 672 408 A2 | 6/2006 |
| TW | M283196 U | 12/2005 |
| TW | 201000987 A | 1/2010 |
| TW | M397172 U | 2/2011 |

*Primary Examiner* — Robert J Sandy
*Assistant Examiner* — David Upchurch
(74) *Attorney, Agent, or Firm* — Muncy, Geissler, Olds & Lowe, P.C.

(57) ABSTRACT

An eyeglass fillet fastener detachably assembled to an eyeglass having a connecting hole or a frame of goggle without temple. The eyeglass fillet fastener includes a connecting member and a sliding member, wherein one side of the connecting member has a fastening portion for fastening with the connecting hole, and the other side of the connecting member has a flexible positioning member and a pivoting portion, and the sliding member is pivoted in the pivoting portion by the flexible positioning portion, so that a user is able to move the position of the sliding member.

9 Claims, 12 Drawing Sheets

(56) References Cited

U.S. PATENT DOCUMENTS

| | | | |
|---|---|---|---|
| 6,349,420 B1 * | 2/2002 | Chiang | 2/428 |
| D511,789 S * | 11/2005 | Canavan et al. | D16/330 |
| 7,055,181 B2 * | 6/2006 | Moormann et al. | 2/448 |
| 7,625,082 B2 * | 12/2009 | Kawanishi | 351/120 |
| 7,703,913 B2 * | 4/2010 | Huang | 351/110 |
| 2002/0122152 A1 * | 9/2002 | Wang-Lee | 351/119 |
| 2005/0132478 A1 * | 6/2005 | Canavan | 2/448 |

* cited by examiner

EYEGLASS FILLET FASTENER

CROSS-REFERENCE TO RELATED APPLICATION

This application claims priority from Taiwan Patent Application No. 102115682, filed on May 2, 2013, in the Taiwan Intellectual Property Office, the content of which are hereby incorporated by reference in their entirety for all purposes.

BACKGROUND OF THE INVENTION

1. Field of the Invention

The present invention generally relates to a fastener, in particular to an eyeglass fillet fastener.

2. Description of the Related Art

The end of an eyeglass temple which is expressed in hook is the most common so far, and the hooking temple is designed to clasp user's ear to prevent the eyeglass slipping or falling. However, if the user wears the preceding eyeglass having hooking temples while doing intense exercise, fall or damage to the eyeglass is inevitable; consequently, in order to avoid the situation, the user may add a fillet on eyeglass temple to fasten the eyeglass. Generally, a fillet is disposed on the straight eyeglass temple, but the fillet may be twisted easily when the user adjusts the angle of the eyeglass temple, so that inconvenience may occur when the user wearing the eyeglass.

SUMMARY OF THE INVENTION

In view of the aforementioned obstacle to the prior art, one of purposes of the present invention is to provide an eyeglass fillet fastener detachably assembled to an eyeglass having a connecting hole, and maintain a fillet of an eyeglass in a horizontal direction by moving a connecting member and a sliding member disposed on the eyeglass in order to prevent the fillet from being twisted.

In order to achieve to the aforementioned purpose of the present invention, an eyeglass fillet fastener comprising a connecting member and a sliding member is therefore provided. One side of the connecting member may have a fastening portion for fastening with a connecting hole, and the other side of the connecting member may have a flexible positioning portion and a pivoting portion, and the sliding member may be pivoted in the pivoting portion by the flexible positioning portion.

Preferably, the fastening portion may be a T-shaped structure, wherein a bottom end of the T-shaped structure may be movably fastened with the connecting hole.

Preferably, the sliding member may be consisted of an arcuate rod and an elongated rod, and both ends of the arcuate rod and both ends of the elongated rod may be connected with each other to form a hollow semicircle shape.

Preferably, stopping members may be disposed on the arcuate rod of the sliding member, and the pivoting portion may be disposed between the stopping members, so a motion range of the sliding member sliding within the pivoting portion may be limited by the stopping members.

Preferably, the connecting member further may have an opening, and one end of the flexible positioning portion may be connected to one end of the opening of the connecting member and the other end of the flexible positioning portion may be suspended.

Preferably, two gaps may be disposed between the opening of the connecting member and the flexible positioning portion for benefiting user to press.

Preferably, the pivoting portion may be an L-shaped structure.

Preferably, the pivoting portion may be disposed in the other end of the opening of the connecting member, and between the flexible positioning portion and the pivoting portion may have an adjustable gap, and the gap between the pivoting portion and the flexible positioning portion may be adjusted by pressing.

Preferably, at least one convex triangle thorn tooth may be disposed on the pivoting portion or the flexible positioning portion.

Preferably, the arcuate rod may be disposed with a plurality of concave and convex thorn teeth.

In conclusion, according to the eyeglass fillet fastener of the present invention, there are one or more advantages as follows:

(1) The connecting member of the eyeglass fillet fastener of the present invention may maintain the fillet penetrating the sliding member in a horizontal direction by adjusting position.

(2) The sliding member of the eyeglass fillet fastener of the present invention can move up and own and maintain the fillet in a horizontal direction to avoid the fillet being twisted after adjusting the position of the connecting member as well as inconvenience while the user wearing the eyeglass.

DETAILED DESCRIPTION OF THE PREFERRED EMBODIMENTS

Figure 1:
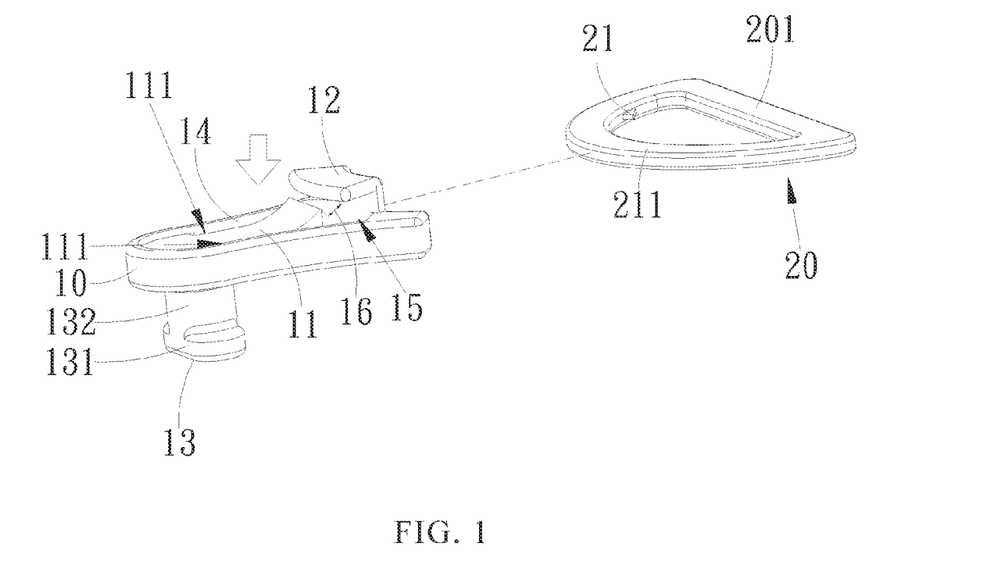
FIG. 1 is a schematic diagram of structure of an eyeglass fillet fastener according to the first preferred embodiment of the present invention.
Figure 2:
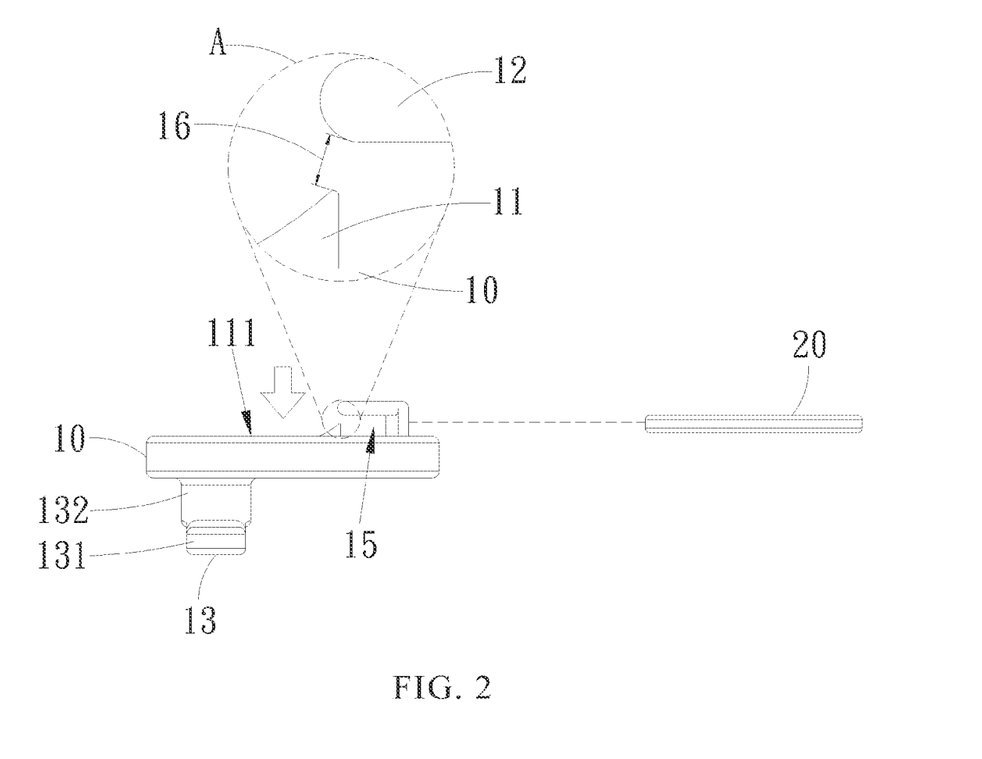
FIG. 2 is a side view of a connecting member and a sliding member of an eyeglass fillet fastener according to the first preferred embodiment of the present invention.
Figure 3:
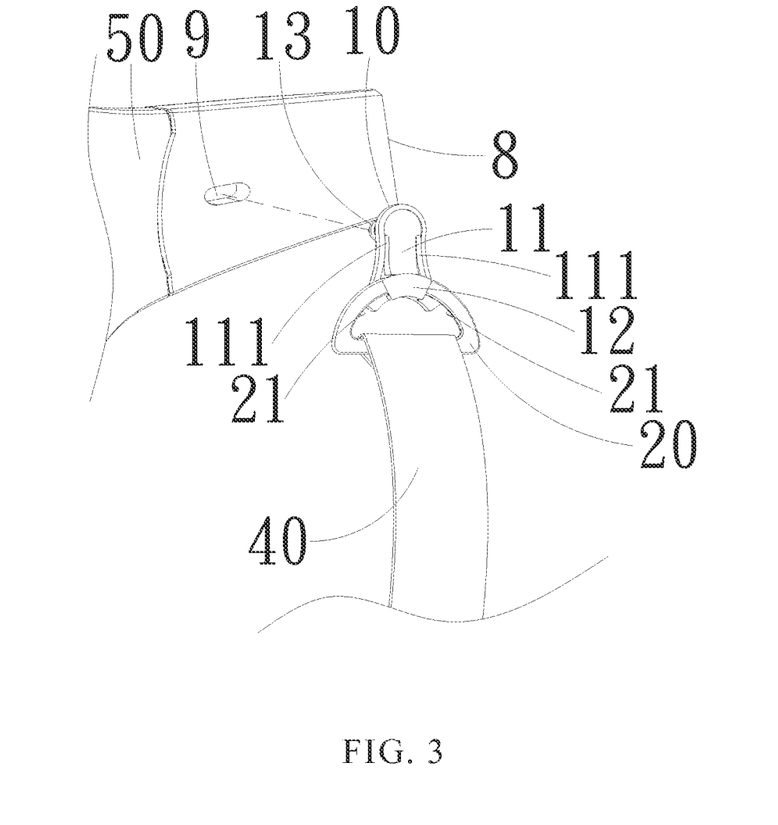
FIG. 3 is a schematic diagram of decomposition of an eyeglass fillet fastener according to the first preferred embodiment of the present invention.

FIG. 1 to FIG. 3 illustrate a schematic diagram of structure of an eyeglass fillet fastener according to the first preferred embodiment of the present invention, a side view of a connecting member and a sliding member of an eyeglass fillet fastener according to the first preferred embodiment of the present invention and a schematic diagram of decomposition of an eyeglass fillet fastener according to the first preferred embodiment of the present invention, respectively. The eyeglass fillet fastener of the present invention is detachably assembled to an eyeglass 50 having a connecting hole 9 or directly assembled to a frame of goggle without temple, wherein the connecting hole 9 may be disposed on a temple 8 of the eyeglass 50 (as shown in FIG. 3). The eyeglass fillet fastener of the present invention comprises a connecting member 10 and a sliding member 20 which are pivoted with each other, and the materials of the connecting member 10 and the sliding member 20 may be plastic, metal or any others which are commonly-used in eyeglass frame. Wherein, one side of the connecting member 10 has a fastening portion 13 for fastening to the connecting hole 9, and the sliding member 20 further provides a fillet 40 which can be penetrated therethrough for a user wearing on the head, and the fastening portion 13 may be a T-shaped structure (as shown in FIG. 1), a bottom end 132 of the T-shaped structure is detachably fastened to the connecting hole 9, and top end 131 penetrates the connecting hole 9.

In addition, the other side of the connecting member 10 has a flexible positioning portion 11 and a pivoting portion 12, wherein the pivoting portion 12 may be an L-shaped structure (as shown in FIG. 2). And, the L-shaped structure has an accommodating space 15, and the sliding member 20 can be pivoted in the accommodating space 15 of the pivoting portion 12 and the sliding member 20 can slide in the accommodating space 15 of the pivoting portion 12 so as to change the position thereof. The sliding member 20 is limited within the pivoting portion 12 by the flexible positioning portion 11, and between the pivoting portion 12 and the flexible positioning portion 11 has an adjustable gap 16 (as shown in drawing of partial enlargement A in FIG. 2), and the user can adjust the gap 16 between the flexible positioning portion 11 and the pivoting portion 12 by pressing the flexible positioning portion 11 (the pressing as shown in the arrow direction of FIG. 1 and FIG. 2). The material of the flexible positioning portion 11 can be any material, as long as the user can adjust the gap 16 between the flexible positioning portion 11 and the pivoting portion 12 by pressing the flexible positioning portion 11 (the pressing can be shown in the arrow direction of FIG. 1 and FIG. 2).

The sliding member 20 may be consisted of an arcuate rod 211 and an elongated rod 201, and both ends of the arcuate rod 211 and both ends of the elongated rod 201 are connected with each other to form a hollow semicircle shape; moreover, the cross section size of the arcuate rod 211 of the sliding member 20 is slightly smaller than that of the accommodating space 15 of the pivoting portion 12 for benefiting the sliding member 20 being assembled in the accommodating space 15 of the pivoting portion 12, so that the user can change the position of the sliding member 20 by sliding the sliding member 20. In addition, stopping member 21 is further disposed on either two sides or single side of the arcuate rod 211 of the sliding member 20, and the pivoting portion 12 is disposed between the stopping members 21, so a motion range of the sliding member 20 sliding within the pivoting portion 12 can be limited by the stopping members 21.

In addition, the connecting member 10 of the present invention can further has an opening 14 selectively, and one end of the flexible positioning portion 11 connects to one end of the opening 14 of the connecting member 10 and the other end of the flexible positioning portion 11 is suspended. And between the opening 14 of the connecting member 10 and the flexible positioning portion 11 can further has the gap 111, selectively, which benefits the user to press. And, the pivoting portion 12 is disposed in the other end of the opening 14 of the connecting member 10. For example, when the user presses the flexible positioning portion 11, the gap 16 between the pivoting portion 12 and the flexible positioning portion 11 will increase, so that the user can assemble the sliding member 20 into the accommodating space 15 of the pivoting portion 12 or take the sliding member 20 out of the accommodating space 15 of the pivoting portion 12. To the contrary, if the user does not press the flexible positioning portion 11, the gap 16 between the pivoting portion 12 and the flexible positioning portion 11 will decrease, so that the sliding member 20 is limited within the accommodating space 15 of the pivoting portion 12 via the flexible positioning portion 11 and the pivoting portion 12.

Figure 4:
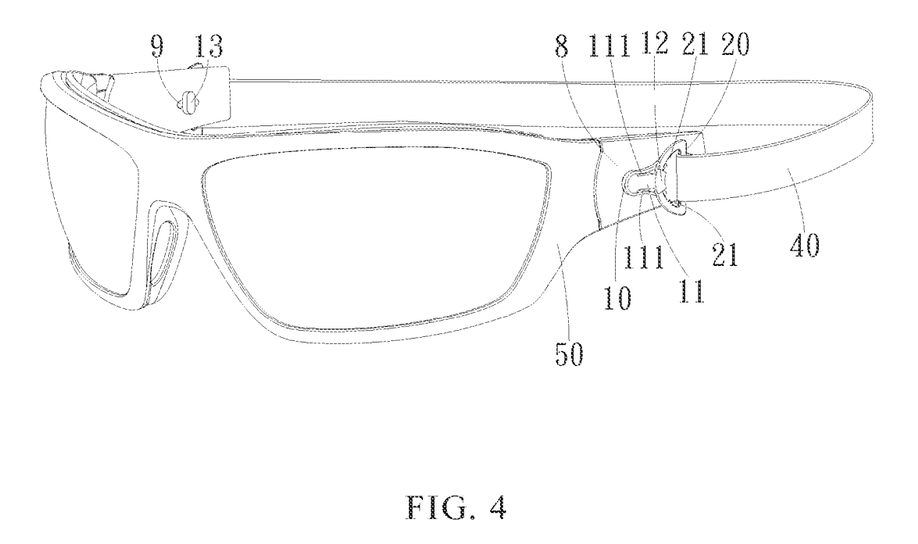
FIG. 4 is the first using aspect diagram of an eyeglass fillet fastener according to the first preferred embodiment of the present invention.
Figure 5:
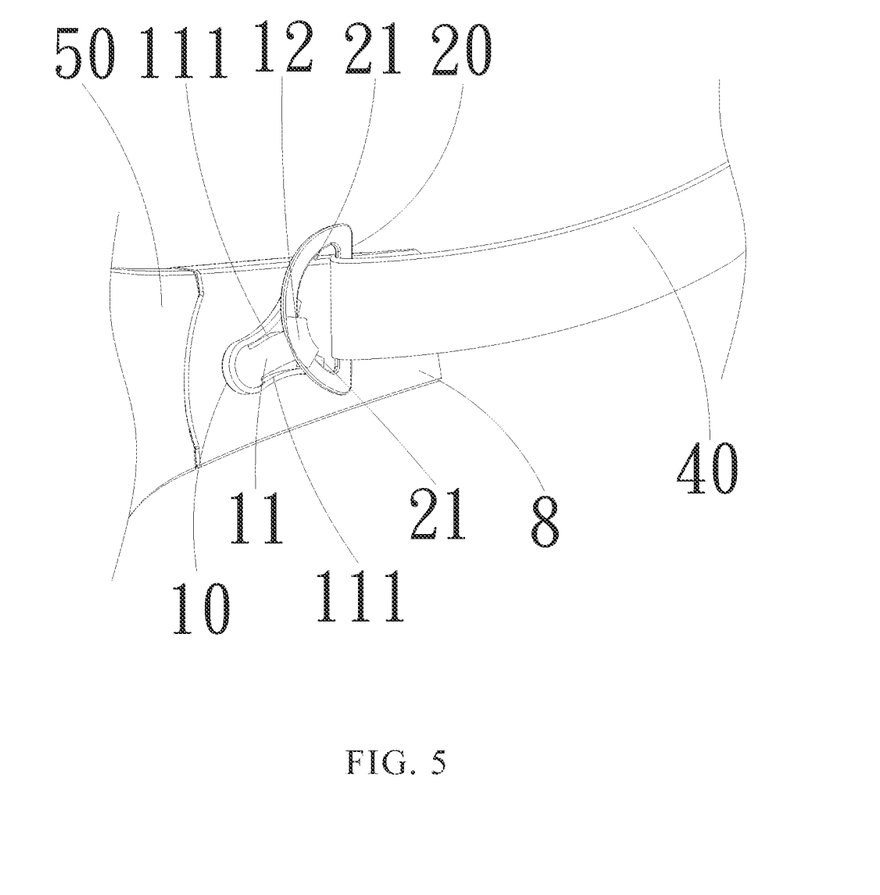
FIG. 5 is the second using aspect diagram of an eyeglass fillet fastener according to the first preferred embodiment of the present invention.
Figure 6:
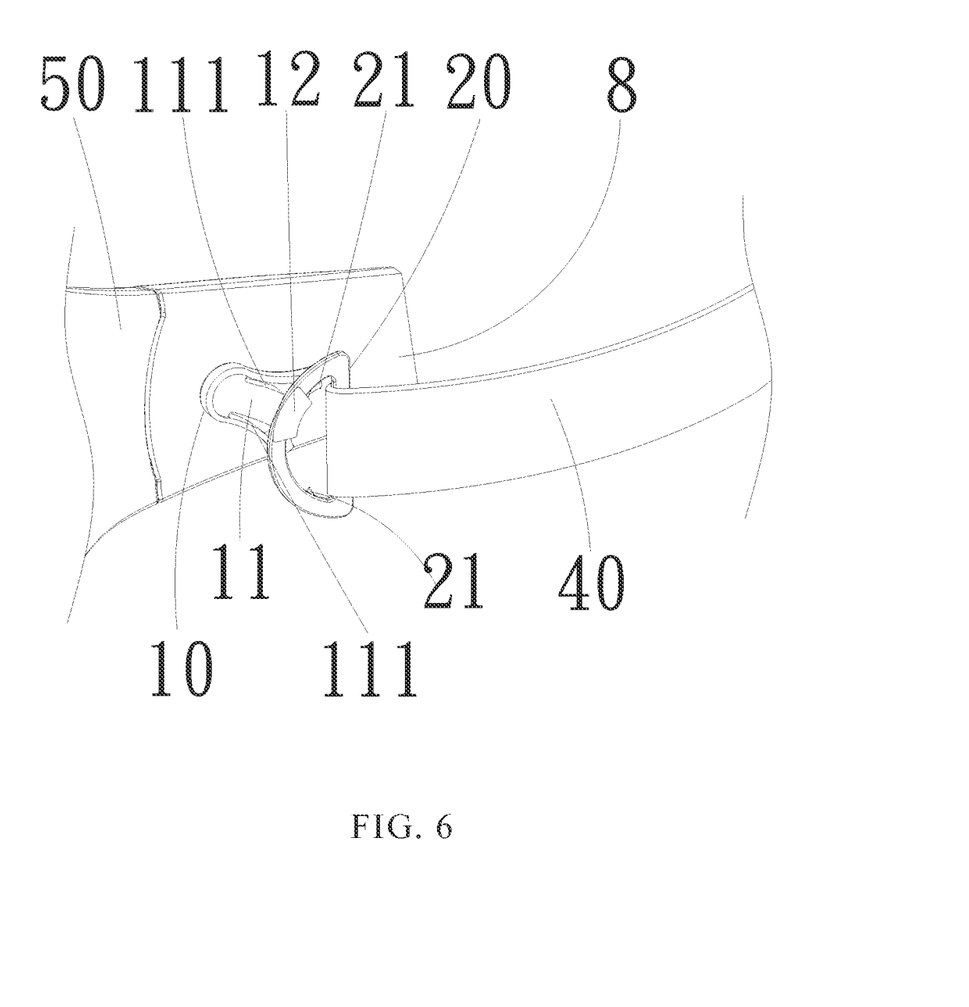
FIG. 6 is the third using aspect diagram of an eyeglass fillet fastener according to the first preferred embodiment of the present invention.

FIG. 4 to FIG. 6 illustrate the first using aspect diagram of an eyeglass fillet fastener according to the first preferred embodiment of the present invention, the second using aspect diagram of an eyeglass fillet fastener according to the first preferred embodiment of the present invention and the third using aspect diagram of an eyeglass fillet fastener according to the first preferred embodiment of the present invention, respectively. As shown in FIG. 4, an eyeglass fillet fastener of the present invention is mainly assembled to the eyeglass 50 having the connecting holes 9, and the connecting holes 9 are disposed on the temple 8 of the eyeglass 50. In practical application, the user fastens the fastening portion 13 of the connection member 10 to the connection holes 9 locating on both sides of the eyeglass 50, and presses the flexible positioning portion 11 to adjust the gap 16 between the flexible positioning portion 11 and the pivoting portion 12 (as shown in FIG. 1 and FIG. 2). When the gap 16 between the flexible positioning portion 11 and the pivoting portion 12 increases, the user is able to assemble the sliding member 20 having the fillet 40 to the accommodating space 15 of the pivoting portion 12, and when the accommodating space 15 of the pivoting portion 12 is assembled in the sliding member 20, the user needn't to press the flexible positioning portion 11 and the gap 16 between the flexible positioning portion 11 and the pivoting portion 12 is decreased so as to limit the sliding member 20 in the accommodating space 15 of the pivoting portion 12. As a result, when the user wears the eyeglass 50 by using the fillet 40 of the sliding member 20 to fasten the eyeglass 50, the eyeglass 50 will not fall while doing intense exercise. In addition, if the user wants to take out the sliding member 20, it only needs to press the flexible positioning portion 11 to increase the gap 16 between the flexible positioning portion 11 and the pivoting portion 12.

Moreover, according to an eyeglass fillet fastener of the present invention, the user is able to selectively rotate the connecting member 10 so as to adjust the direction thereof. For example, after the connecting member 10 is adjusted upwardly by the user (as shown in FIG. 5), the sliding member 20 can be moved upwardly as well, and the stopping members 21 below thereby stops the pivoting portion 12, so that the fillet 40 penetrated in the sliding member 20 can be maintained in a horizontal direction without twisting the fillet 40, so that the user will not feel uncomfortable while wearing it. Apart from the above description, according to an eyeglass fillet fastener of the present invention, the user can further selectively rotate the connecting member 10 to adjust its direction downwardly (as shown in FIG. 6), and then moves the sliding member 20 downwardly, so that the stopping members 21 above stops the pivoting portion 12 to maintain the fillet 40 of the sliding member 20 in a horizontal direction and without being twisted.

Figure 7A:
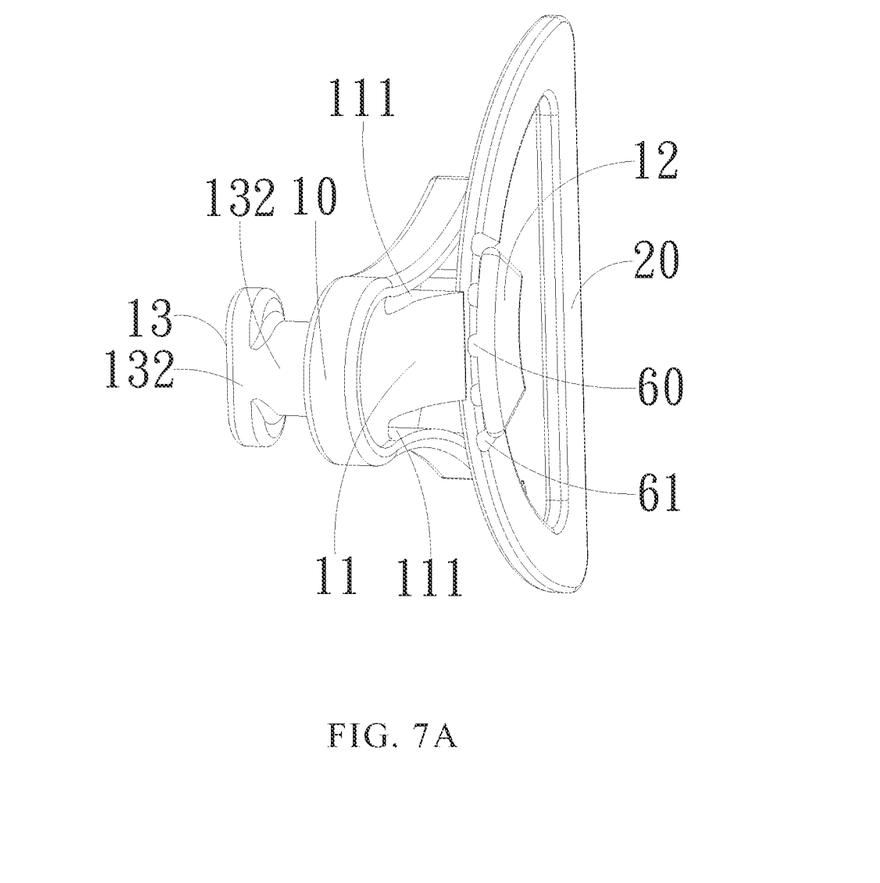
FIG. 7A is a schematic diagram of structure of an eyeglass fillet fastener according to the second preferred embodiment of the present invention.
Figure 7B:
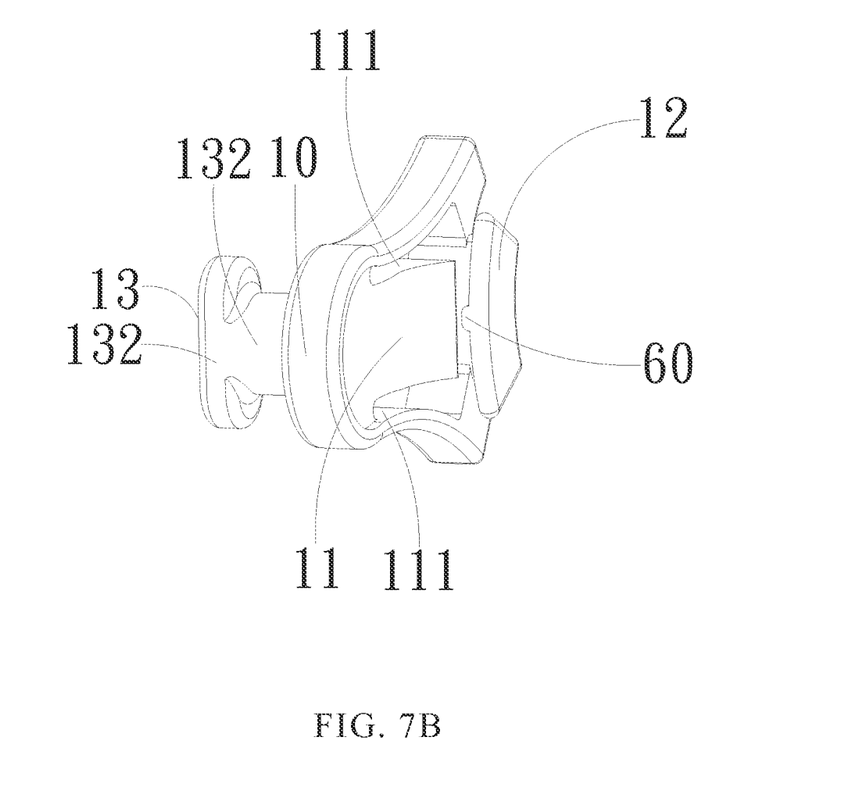
FIG. 7B is a schematic diagram of structure of a connecting member of an eyeglass fillet fastener according to the second preferred embodiment of the present invention.
Figure 7C:
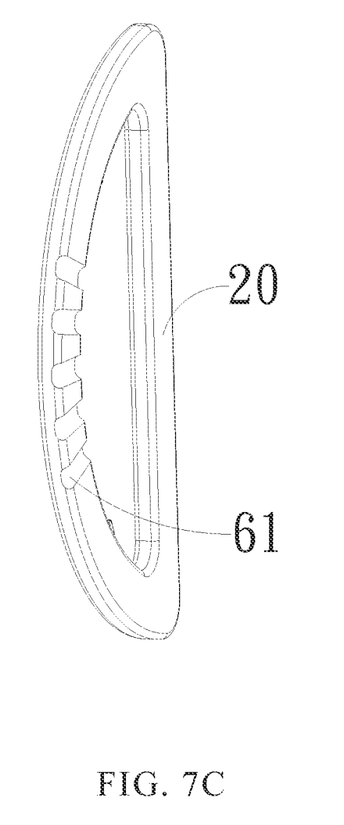
FIG. 7C is a schematic diagram of structure of a sliding member of an eyeglass fillet fastener according to the second preferred embodiment of the present invention.

FIG. 7A to FIG. 7C illustrate a schematic diagram of structure of an eyeglass fillet fastener according to the second preferred embodiment of the present invention, a schematic diagram of structure of a connecting member of an eyeglass fillet fastener according to the second preferred embodiment of the present invention and a schematic diagram of structure of a sliding member of an eyeglass fillet fastener according to the second preferred embodiment of the present invention, respectively. For example, an eyeglass fillet fastener of the present invention may further dispose at least one convex triangle thorn tooth 60 (as shown in FIG. 7B) on the pivoting portion 12 of the connecting member 10, and one side of the sliding member 20 is disposed with a plurality of concave and convex thorn teeth 61 (as shown in FIG. 7C).

To continue the aforementioned description, when the user assembles the sliding member 20 to the accommodating space 15 of the pivoting portion 12, the convex triangle thorn tooth 60 of the pivoting portion 12 and the concave and convex thorn teeth 61 of the sliding member 20 engage with each other; namely, the location of the plurality of concave and convex thorn teeth 61 corresponds to the convex triangle thorn tooth 60 of the pivoting portion 12, and the convex triangle thorn tooth 60 of the pivoting portion 12 conducting positioning by selecting one of the concave and convex thorn teeth 61 of the sliding member 20 (as shown in FIG. 7A). As a result, by moving the sliding member 20 only, the user can adjust the convex triangle thorn tooth 60 of the pivoting portion 12 to engage with one of the concave and convex thorn teeth 61 of the sliding member 20 correspondingly so as to accomplish the position. According to the aforementioned description, the difference between the second embodiment and the first embodiment of the present invention merely depends on the different structures of the pivoting portion 12 and the sliding member 20, and location, function and purpose of the other components are all the same, and hence, the unnecessary details are no longer provided.

Figure 8A:
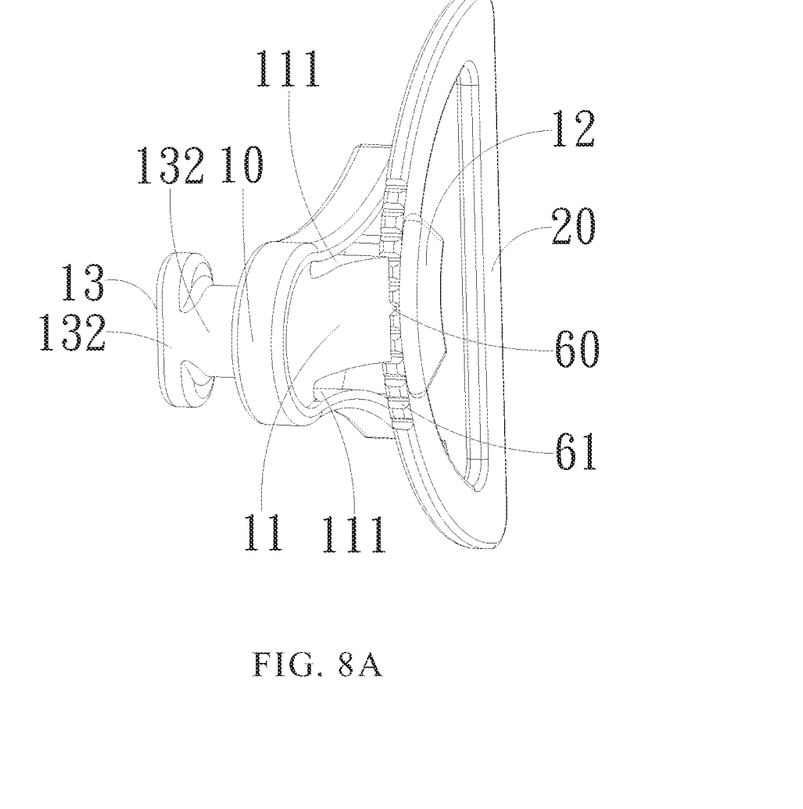
FIG. 8A is a schematic diagram of structure of an eyeglass fillet fastener according to the third preferred embodiment of the present invention.
Figure 8B:
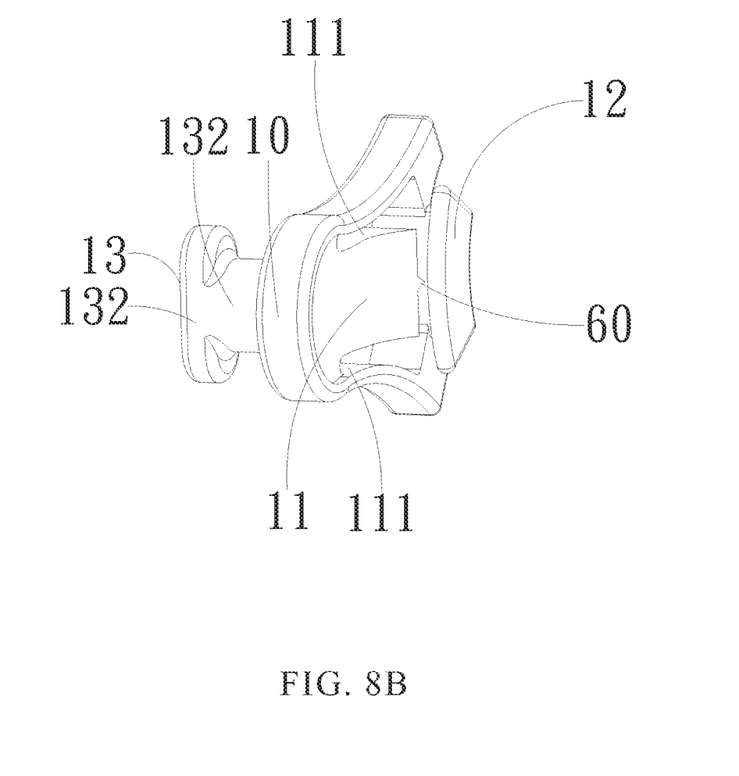
FIG. 8B is a schematic diagram of structure of a connecting member of an eyeglass fillet fastener according to the third preferred embodiment of the present invention.
Figure 8C:
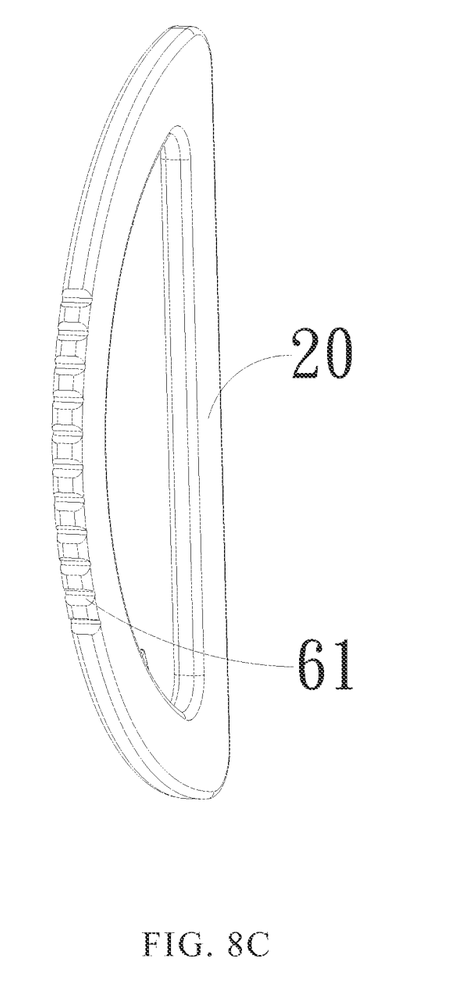
FIG. 8C is a schematic diagram of structure of a sliding member of an eyeglass fillet fastener according to the third preferred embodiment of the present invention.

FIG. 8A to FIG. 8C illustrate a schematic diagram of structure of an eyeglass fillet fastener according to the third preferred embodiment of the present invention, a schematic diagram of structure of a connecting member of an eyeglass fillet fastener according to the third preferred embodiment of the present invention and a schematic diagram of structure of a sliding member of an eyeglass fillet fastener according to the third preferred embodiment of the present invention, respectively. For example, an eyeglass fillet fastener of the present invention may further dispose at least one convex triangle thorn tooth 60 (as shown in FIG. 8B) on the flexible positioning portion 11 of the connecting member 10, and one side of the sliding member 20 is disposed with a plurality of concave and convex thorn teeth 61 (as shown in FIG. 8C).

To continue the aforementioned description, when the user assembles the sliding member 20 to the accommodating space 15 of the pivoting portion 12, the convex triangle thorn tooth 60 of the flexible positioning portion 11 and the concave and convex thorn teeth 61 of the sliding member 20 engage with each other; namely, the location of the plurality of concave and convex thorn teeth 61 corresponds to the convex triangle thorn tooth 60 of the flexible positioning portion 11, and the convex triangle thorn tooth 60 of the flexible positioning portion 11 conducting positioning by selecting one of the concave and convex thorn teeth 61 of the sliding member 20 (as shown in FIG. 8A). As a result, by moving the sliding member 20 only, the user can adjust the convex triangle thorn tooth 60 of the flexible positioning portion 11 to engage with one of the concave and convex thorn teeth 61 of the sliding member 20 correspondingly so as to accomplish the position. According to the aforementioned description, the difference between the third embodiment and the first embodiment of the present invention merely depends on the different structures of the flexible positioning portion 11 and the sliding member 20, and location, function and purpose of the other components are all the same, and hence, the unnecessary details are no longer provided.

In conclusion, according to the design of an eyeglass fillet fastener of the present invention, while the user adjusts the position of the connecting member, the fillet of the sliding member can still maintain in a horizontal direction and without being twisted due to adjustment of the connecting member, so that the user will not feel uncomfortable when wears the eyeglass.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. An eyeglass fillet fastener detachably assembled to an eyeglass having a connecting hole, comprising:
    a connecting member having a fastening portion in one side for fastening with the connecting hole, and the other side of the connecting member having a flexible positioning portion and a pivoting portion; and
    a sliding member pivoted in the pivoting portion by the flexible positioning portion, wherein the sliding member consists of an arcuate rod and an elongated rod, and both ends of the arcuate rod and the elongated rod are connected with each other to form a hollow semicircle shape.

2. The eyeglass fillet fastener as defined in claim 1, wherein the fastening portion is a T-shaped structure and a bottom end of the T-shaped structure is movably fastened with the connecting hole.

3. The eyeglass fillet fastener as defined in claim 1, wherein two stopping members are disposed on the arcuate rod of the sliding member, and the pivoting portion is disposed between the stopping members, so a motion range of the sliding member sliding within the pivoting portion is limited by the stopping members.

4. The eyeglass fillet fastener as defined in claim 1, wherein the connecting member further has an opening, one end of the flexible positioning portion is connected to one end of the opening of the connecting member and the other end of the flexible positioning portion is suspended.

5. The eyeglass fillet fastener as defined in claim 4, wherein two gaps are disposed between the opening of the connecting member and the flexible positioning portion for benefiting user to press.

6. The eyeglass fillet fastener as defined in claim 5, wherein the pivoting portion is an L-shaped structure.

7. The eyeglass fillet fastener as defined in claim 6, wherein the pivoting portion is disposed in the other end of the opening of the connecting member, and between the flexible positioning portion and the pivoting portion has a gap, and the gap between the pivoting portion and the flexible positioning portion is adjusted by pressing.

8. The eyeglass fillet fastener as defined in claim 1, wherein at least one convex triangle thorn tooth is disposed on the pivoting portion or the flexible positioning portion.

9. The eyeglass fillet fastener as defined in claim 8, wherein the arcuate rod is disposed with a plurality of concave and convex thorn teeth.

\* \* \* \* \*